(12) United States Patent
Horikawa

(10) Patent No.: US 6,514,003 B2
(45) Date of Patent: Feb. 4, 2003

(54) SHAFT COUPLING STRUCTURE, AND METHOD FOR MANUFACTURING DIVIDED SPLINE USED FOR SHAFT COUPLING STRUCTURE

(75) Inventor: Seiichi Horikawa, Komatsu (JP)

(73) Assignee: Komatsu Artec Ltd., Komatsu (JP)

( * ) Notice: Subject to any disclaimer, the term of this patent is extended or adjusted under 35 U.S.C. 154(b) by 0 days.

(21) Appl. No.: 09/813,123

(22) Filed: Mar. 21, 2001

(65) Prior Publication Data

US 2002/0025219 A1 Feb. 28, 2002

(30) Foreign Application Priority Data

Aug. 23, 2000 (JP) ......................................... 2000-252329

(51) Int. Cl.[7] ................................................ F16C 3/00
(52) U.S. Cl. ................................ 403/359.2; 403/359.1; 464/182
(58) Field of Search ..................... 403/359.1–359.6, 403/345, 353; 464/182, 160; 188/67, 69; 72/444, 429, 452.4; 192/45, 41 R, 125 B, 129 R

(56) References Cited

U.S. PATENT DOCUMENTS

| | | | | |
|---|---|---|---|---|
| 4,473,317 A | * | 9/1984 | Bolang | 403/359 |
| 4,685,823 A | * | 8/1987 | Lopez | 403/359 |
| 4,989,712 A | * | 2/1991 | Janiszewski | 192/106.1 |
| 5,169,357 A | * | 12/1992 | Graton | 464/68 |

FOREIGN PATENT DOCUMENTS

JP 4-354602 12/1992

* cited by examiner

Primary Examiner—Lynne H. Browne
Assistant Examiner—Michael P. Ferguson
(74) Attorney, Agent, or Firm—Armstrong, Westerman & Hattori, LLP.

(57) ABSTRACT

A shaft coupling structure includes: a span-ring (20) acting as a friction coupling of main power transmitting means between a drive shaft (7) as a shaft-side member and a brake center (18) as a boss-side member; and mechanical engaging means (30) as auxiliary power transmitting means provided adjacent to the span-ring (20) so as to engage the drive shaft (7) with the brake center (18) when the transmission of the rotary power by the span-ring (20) is insufficient. Accordingly, since the torque transmission is conducted by the mechanical engaging means (30) even when slippage is occurred in the span-ring (20), an optimal transmission torque can be ensured, thereby obtaining sufficient reliability of transmission torque.

5 Claims, 17 Drawing Sheets

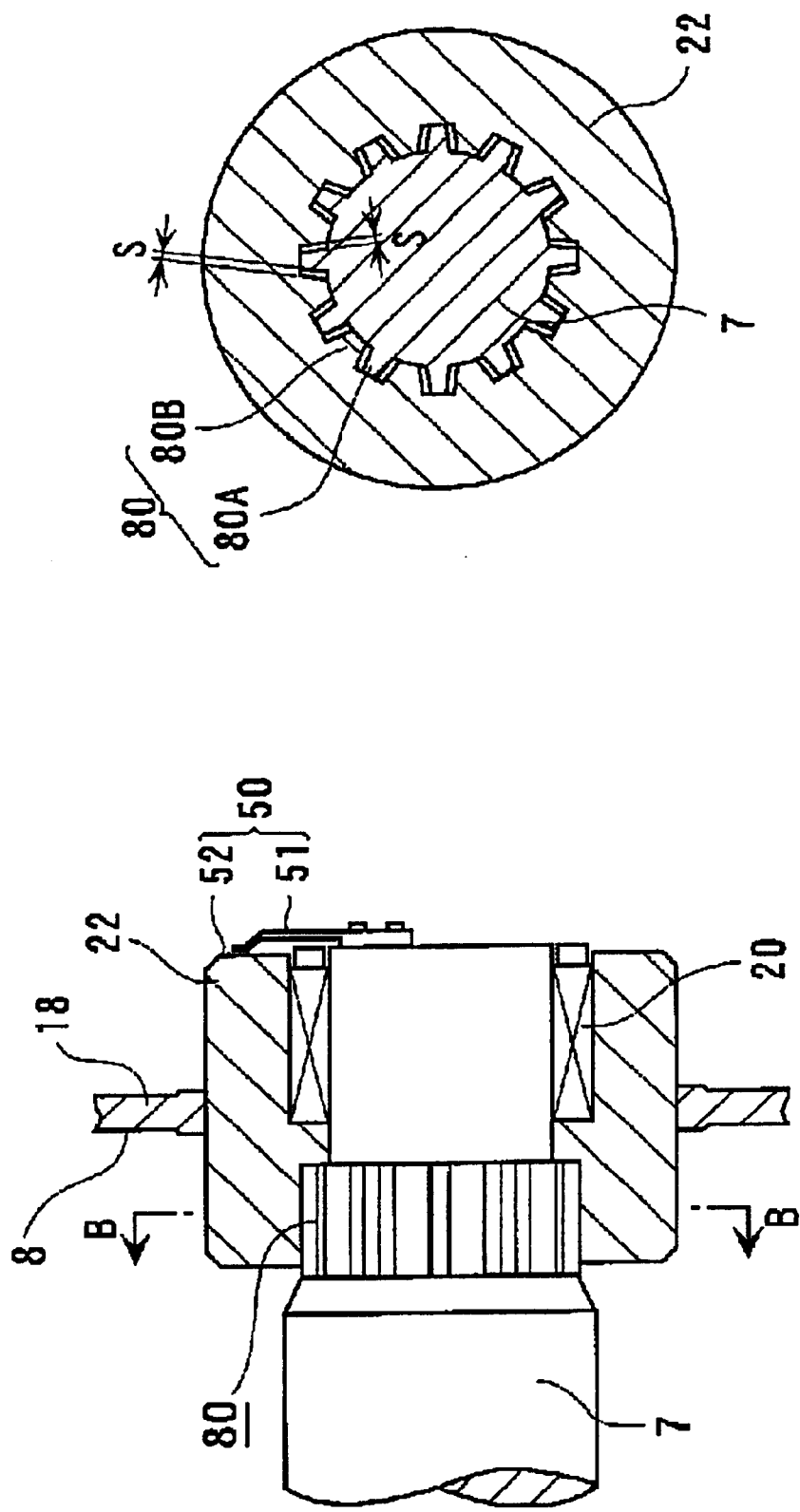

SHAFT COUPLING STRUCTURE, AND METHOD FOR MANUFACTURING DIVIDED SPLINE USED FOR SHAFT COUPLING STRUCTURE

BACKGROUND OF THE INVENTION

1. Field of the Invention

The present invention relates to a shaft coupling structure and a method for manufacturing a divided spline to be used in the shaft coupling structure. More specifically, it relates to a shaft coupling structure used, for instance, for coupling a brake center to a drive shaft in a mechanical press, and a method for manufacturing a divided spline to be used in the shaft coupling structure.

2. Description of Related Art

There has been used a mechanical engaging structure adopting an involute spline, as a coupling structure for transmitting a torque between a clutch center and a drive shaft and between a brake center and a drive shaft.

In this type of structure, involute splines have some backlash (.e., slack or gap in the operational direction) therebetween from the first. Further, in such a structure, the spline portions are worn by usage over years, resulting in a larger backlash. To overcome the above, it is conceivable to zero out the backlash, but this is impractical, such as due to difficulty in assembling. As a result of the above circumstances, sufficient power from a drive shaft is hardly transmitted to its associated member, resulting in the replacement of a drive shaft, for example. This has problematically required a lot of repair cost.

Meanwhile, there has been also used a coupling structure based on a friction coupling such as a span-ring. This coupling structure based on the friction coupling has been widely used, since the structure has such advantages that it is easy to conduct positioning and phasing, the backlash after jointing is zero, and the machining cost is low.

Incidentally, in case of a friction coupling, the transmission torque depends on a clamping torque and on friction coefficients of the friction transmitting portions. As such, there is caused slippage in the friction coupling such as due to: wear-out of engaging surfaces by repeated loads of transmission torques and usage over years; reduction of a clamping force such as by vibration; and errors of a clamping operation. This results in a problem of an insufficient torque, thereby failing to provide sufficient reliability of the transmission torque.

SUMMARY OF THE INVENTION

It is therefore an object of the present invention to provide a shaft coupling structure which restricts slippage while conducting power transmission in a friction manner, to thereby provide an optimum and sufficient transmission torque.

It is another object of the present invention to provide a method for manufacturing a divided spline usable in the above shaft coupling structure, with higher precision.

Accordingly, the present invention provides a shaft coupling structure for transmitting a rotary power between a shaft-side member and a boss-side member, the shaft coupling structure comprising: friction-type main power transmitting means provided between the shaft-side member and the boss-side member; and auxiliary power transmitting means provided adjacent to the main power transmitting means so as to mechanically engaging the shaft-side member with the boss-side member.

According to such a constitution of the present invention, there can be conducted backlash-free transmission by the friction coupling by adopting the friction coupling as the main power transmitting means and the mechanical engaging means as the auxiliary power transmitting means, and there can be conducted torque transmission by the mechanical engaging means even upon occurrence of slippage in the friction coupling, thereby obtaining sufficient reliability of transmission torque.

In the present invention, the main power transmitting means may be any type structure of friction coupling insofar as capable of ensuring a suitable transmission torque, such as utilizing a span-ring, shrink fit and cooling fit.

As the auxiliary power transmitting means, there can be adopted various mechanical engaging means such as a key connection, pin connection, and spline connection.

In the shaft coupling structure of the present invention, the auxiliary power transmitting means preferably has a predetermined gap in the rotational direction.

In such a constitution of the present invention, the auxiliary power transmitting means based on mechanical engagement has a predetermined gap in the rotational direction, so that the torque transmission under a normal condition is conducted, not by the auxiliary power transmitting means, but exclusively by the friction-type main power transmitting means. Thus, those parts constituting the auxiliary power transmitting means can be kept from the affection of repeated loads of transmission torques, thereby allowing to prevent wear and damage of the constituent parts of the auxiliary power transmitting means and to restrict the depletion of the parts.

In the shaft coupling structure of the present invention, the auxiliary power transmitting means preferably comprises a divided spline.

This enables assured torque transmission of a large amount, and allows a simplified mechanism.

In the shaft coupling structure of the present invention applied to a brake device of a press machine, the drive shaft of the brake device is preferably the shaft-side member and the brake center of the brake device is preferably the boss-side member.

In this way, the above described shaft coupling structure of the present invention is applied to between the drive shaft and brake center constituting the brake device of the mechanical press where it is required to transmit a large torque with high precision, so that the effect of the shaft coupling structure of the present invention can be maximally utilized.

Further, even upon occurrence of slippage in the friction coupling as the main power transmitting means such as due to usage over years, there can be assuredly conducted the torque transmission by the auxiliary power transmitting means, so as to prevent trouble of the brake, thereby achieving a mechanical press having higher safety.

The present invention further provides a method for manufacturing a divided spline usable as the auxiliary power transmitting means constituting the shaft coupling, comprising the steps of: finishing both end surfaces of a toroidal member as a blank of the divided spline; cutting the toroidal member as the blank in the radial direction thereof to thereby divide the toroidal member into a predetermined number of divided parts, and finishing the cut surfaces of the divided parts; and assembling the divided parts by a jig while mating the cut surfaces with each other, and splining at least the inner peripheries of the respective divided parts.

According to such a constitution of the present invention, the divided spline is constituted of a predetermined number of divided parts, so that the divided spline can be later mounted onto the shaft-side member, to thereby simplify the mounting.

Although the divided spline is constituted of such a predetermined number of divided parts, the divided spline can be manufactured with higher precision because the divided parts are splined in a state assembled by a jig(s).

Preferably, the manufacturing method for manufacturing a divided spline of the present invention further comprises the steps of: before dividing the toroidal member, marking thereon a circle having a diameter taking account of cutting margins and finishing margins, and machining, on the marked circle, hole positions for coupling to the jig.

According to such a constitution of the present invention, assembling of the divided parts and jig can be facilitated.

BRIEF DESCRIPTION OF THE DRAWINGS

FIG. 17(A) and FIG. 17(B) are views showing a fourth embodiment of the present invention, FIG. 17(A) being a cross-sectional view showing a shaft coupling structure, FIG. 17(13) being a cross-sectional view taken along B—B line in FIG. 17(A).

DETAILED DESCRIPTION OF THE PREFERRED EMBODIMENTS

There will be described hereinafter the embodiments according the present invention, with reference to the accompanying drawings.

[First Embodiment]

Figure 1:
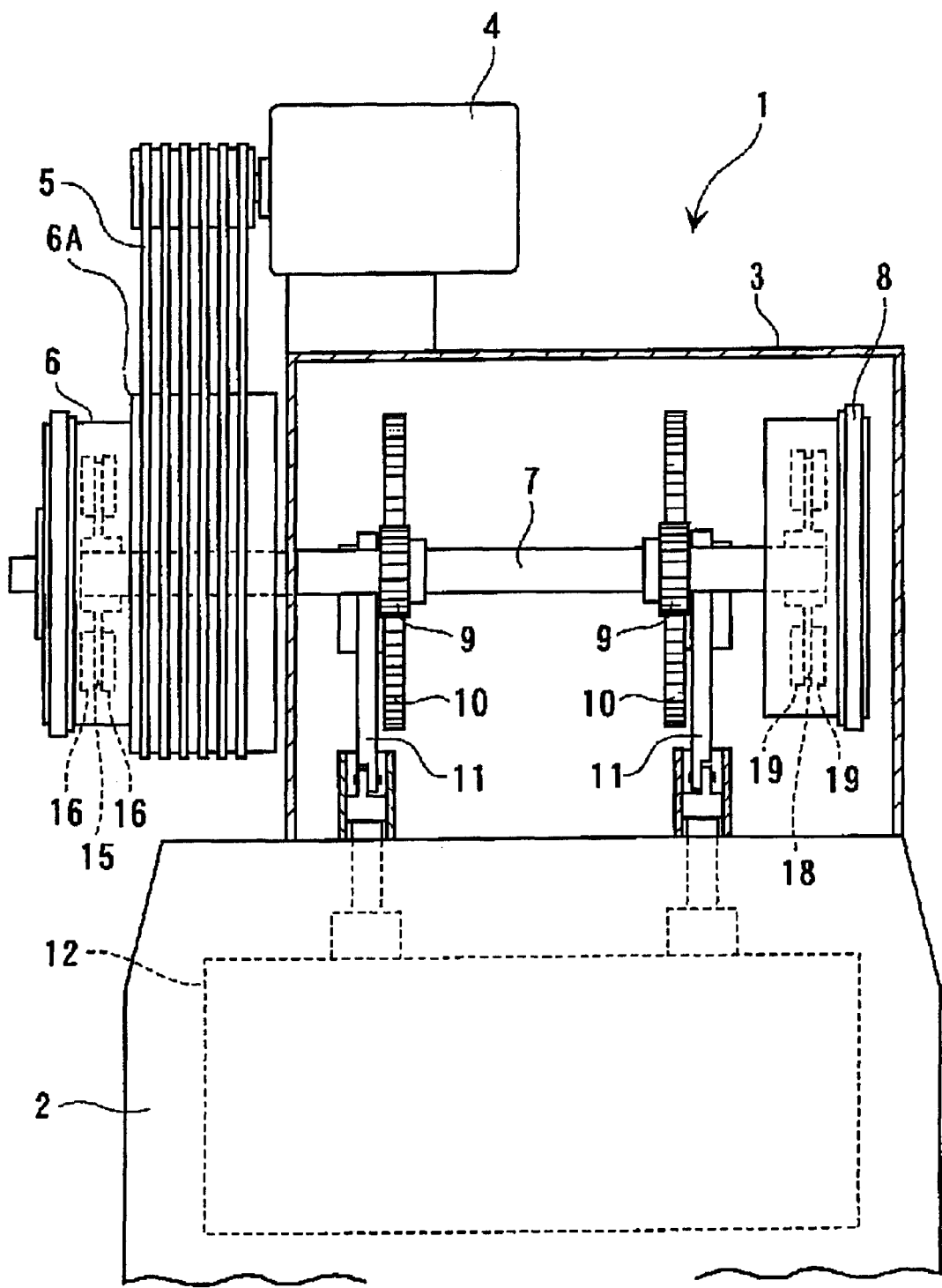
FIG. 1 is a partial cross-sectional view showing an upper part of a mechanical press according to a first embodiment of the present invention.

FIG. 1 shows an upper part of a press machine 1. The press machine 1 is provided with an upright 2 provided on an upper surface of a bed (not shown), and a crown 3 provided on the upright 2. Provided on the upper surface of the crown 3 is a motor 4 the driving force of which is transmitted to a flywheel 6a of a clutch device 6 via belt 5. The clutch device 6 is coupled to one end of a drive shaft 7 as a shaft-side member, and the drive shaft 7 has the other end mounted with a brake device 8.

The drive shaft 7 is provided with two gears 9 separated by a predetermined distance between the clutch device 6 and brake device 8, and these gears 9 are meshed with main gears 10 fixed to a crankshaft (not shown). The crankshaft is provided with connecting rods 11 coupled to a slide 12 having a lower surface to which an upper mold may be mounted.

The clutch device 6 is provided with a disk shaped clutch center 15 acting as a friction plate mounted to the drive shaft 7. The clutch device 6 is constituted such that the rotary power from the motor 4 is transmitted to the drive shaft 7 by clamping the clutch center 15 (clutch ON) by clutch members 16 from both sides of the clutch center 15 such as by utilizing an air pressure, and released from the drive shaft 7 by releasing the clutch members 16 from the clutch center 15 (clutch OFF).

The brake device 8 has a structure substantially identical with the clutch device 6, and provided with a disk shaped brake center 18 acting as a friction plate. The brake device 8 is constituted such that the brake is effected and released by clamping the brake center 18 as a boss-side member by brake members 19 by utilizing a spring pressure and an air pressure, and by releasing the clamping, respectively. In the above, the spring pressure is set in a direction for effecting the brake, to thereby ensure the safety upon air leakage.

In the aforementioned press machine 1, there is adopted a shaft coupling structure of the present invention so as to transmit a rotary power between the drive shaft 7 and brake center 18.

Figure 2:
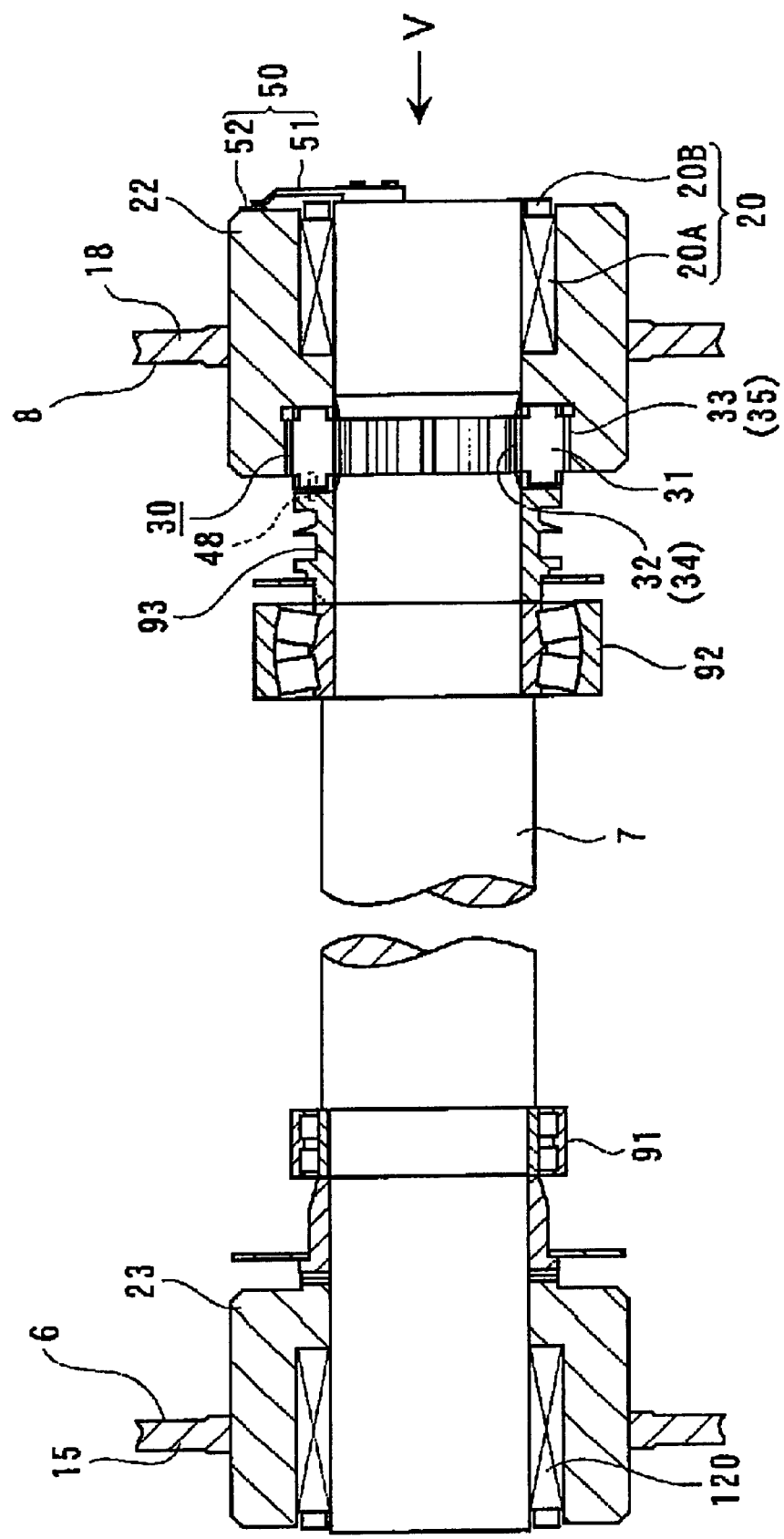
FIG. 2 is a cross-sectional view showing a shaft coupling structure of the first embodiment.

As shown in FIG. 2, the shaft coupling structure of this embodiment comprises: a span-ring 20 constituting a friction coupling as main power transmitting means; and mechanical engaging means 30 of a divided spline type as auxiliary power transmitting means.

Namely, as described above, the brake device 8 is provided with the brake center 18 which is fixed, such as by welding, to a boss 22 fitted onto the drive shaft 7.

The boss 22 is provided with, at its interior, the span-ring 20 in a manner such as disclosed by Japanese Patent Laid-Open Publication No. Hei-4-354602 (354602/1992).

The span-ring 20 is interposed between an inner partial periphery of the boss 22 and an outer periphery of the end of the drive shaft 7, and includes a body portion 20A and an clamping adjustment portion 20B.

The span-ring 20 is constituted such that, when the clamping adjustment portion 20B is clamped, the outer periphery of the body portion 20A is expanded due to the action of a member (not shown) having a wedge cross section provided within the body portion 20A, to thereby tightly fit the outer periphery of the drive shaft 7 and the inner periphery of the boss 22 to each other.

Thus, the drive shaft 7 and brake center 18 are firmly coupled to each other, to thereby transmit a torque (rotary power) between the drive shaft 7 and brake center 18.

Since the transmission torque is determined by the size of the inner diameter of the span-ring 20, the size setting of the inner diameter is conducted such as in view of the degree of the capacity of the mechanical press.

Provided at a position adjacent to the span-ring 20 is the mechanical engaging means 30 as the auxiliary power transmitting means which engages the drive shaft 7 to the boss 22, i.e., to the brake center 18, when the transmission of the rotary power by the span-ring 20 is insufficient.

The mechanical engaging means 30 is provided with a spline bush 31 acting as a divided spline which is interposed between the boss 22 and drive shaft 7.

Figure 3:
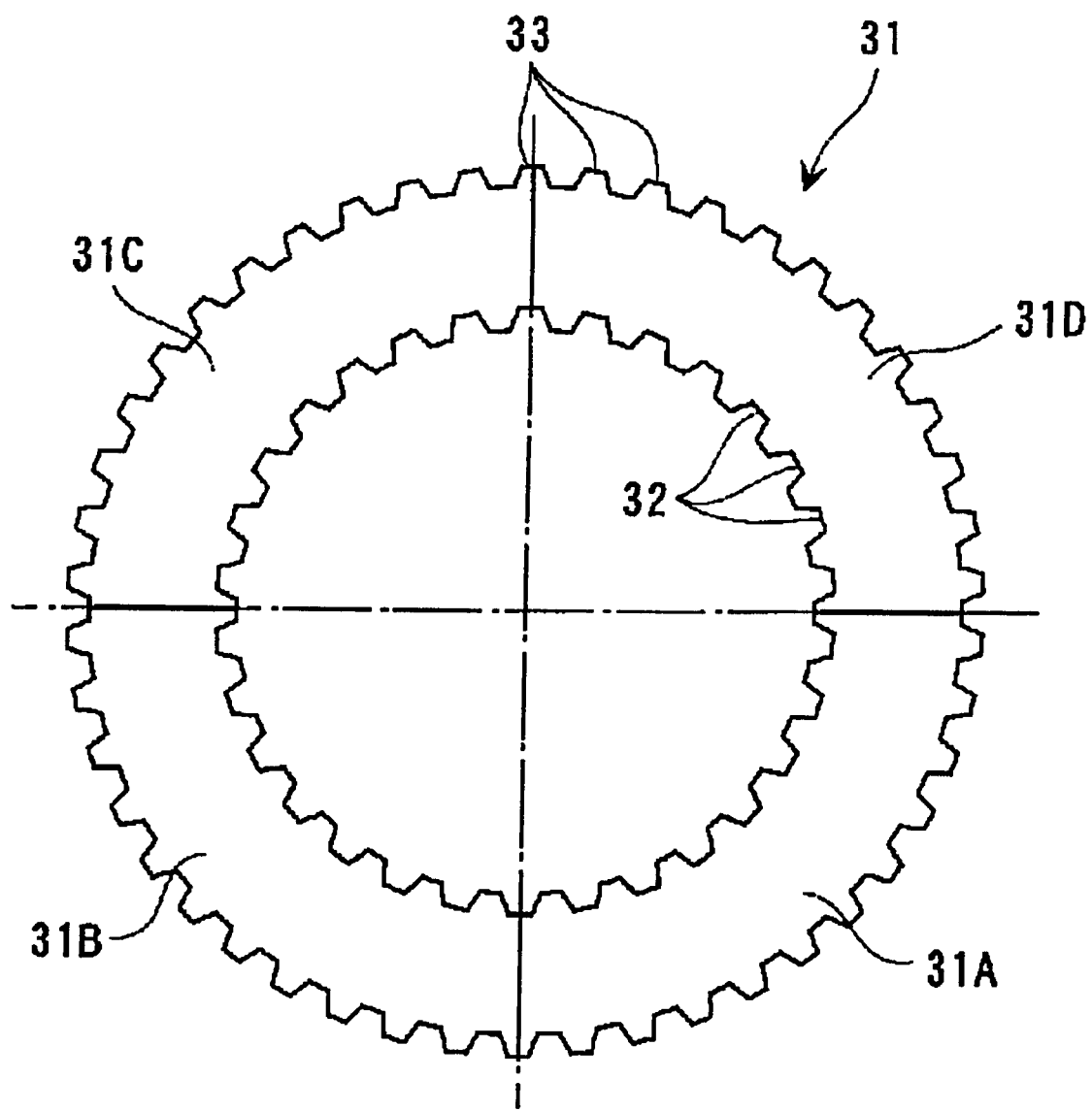
FIG. 3 is an enlarged view showing essential parts of the first embodiment.
Figure 4:
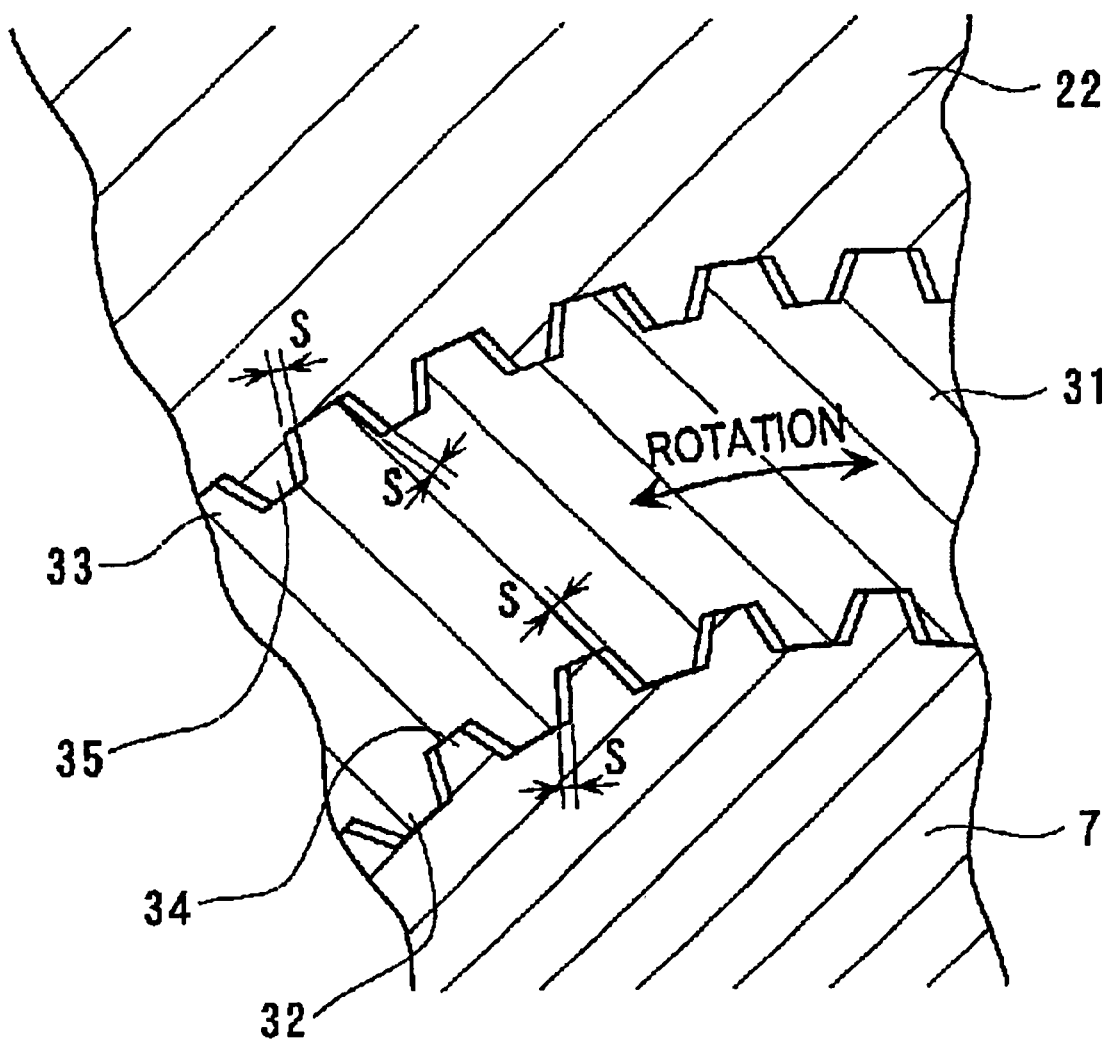
FIG. 4 is an enlarged view showing involute spline portions of the above embodiment.

As shown in FIGS. 3 and 4, the spline bush 31 is constituted by combiningly using quarter spline members 31A to 31D, so as to form an inside involute spline 32 (to be merely called "inside spline" hereinafter) and an outside involute spline 33 (to be merely called "outside spline") at the inner and outer diameter portions, respectively, of the spline bush, upon combining the spline members 31A to 31D with one another.

For such a spline bush 31, the boss 22 is formed with, at the inner diameter thereof, an inner involute spline 35 engageable with the outside spline 33. Further, the drive shaft 7 is formed with, at the outer periphery thereof, an outer involute spline 34 engageable with the inside spline 32.

As shown in FIG. 4, there are formed predetermined gaps S such as on the order of 1 mm in the rotational direction, for each tooth, between the outside spline 33 and the inner involute spline 35 of the boss 22 and between the inside spline 32 and the outer involute spline 34 of the drive shaft 7. Thus, no power is transmitted between the drive shaft 7 and brake center 18 under a normal condition.

However, when the drive shaft 7 and brake center 18 are discrepantly rotated by slippage of the span-ring 20 such as due to usage over years, the teeth portions of the outer involute spline 34 of the drive shaft 7 and those of the inside spline 32 of the spline bush 31 are meshed with each other, to thereby fill up the gaps S so that the drive shaft 7 and spline bush 31 are engaged with each other, thereby finally allowing transmission of the power therebetween. Further, the inner involute spline 35 of the boss 22 and the outside spline 33 of the spline bush 31 are also engaged at this time.

The clamping ability, i.e., the power transmitting ability of the mechanical engaging means 30 is made to be substantially the same as the aforementioned span-ring 20, such as by duly setting the diameter dimensions and the length dimensions of the meshing portions of the inside spline 32 and outside spline 33, for example.

Figure 5:
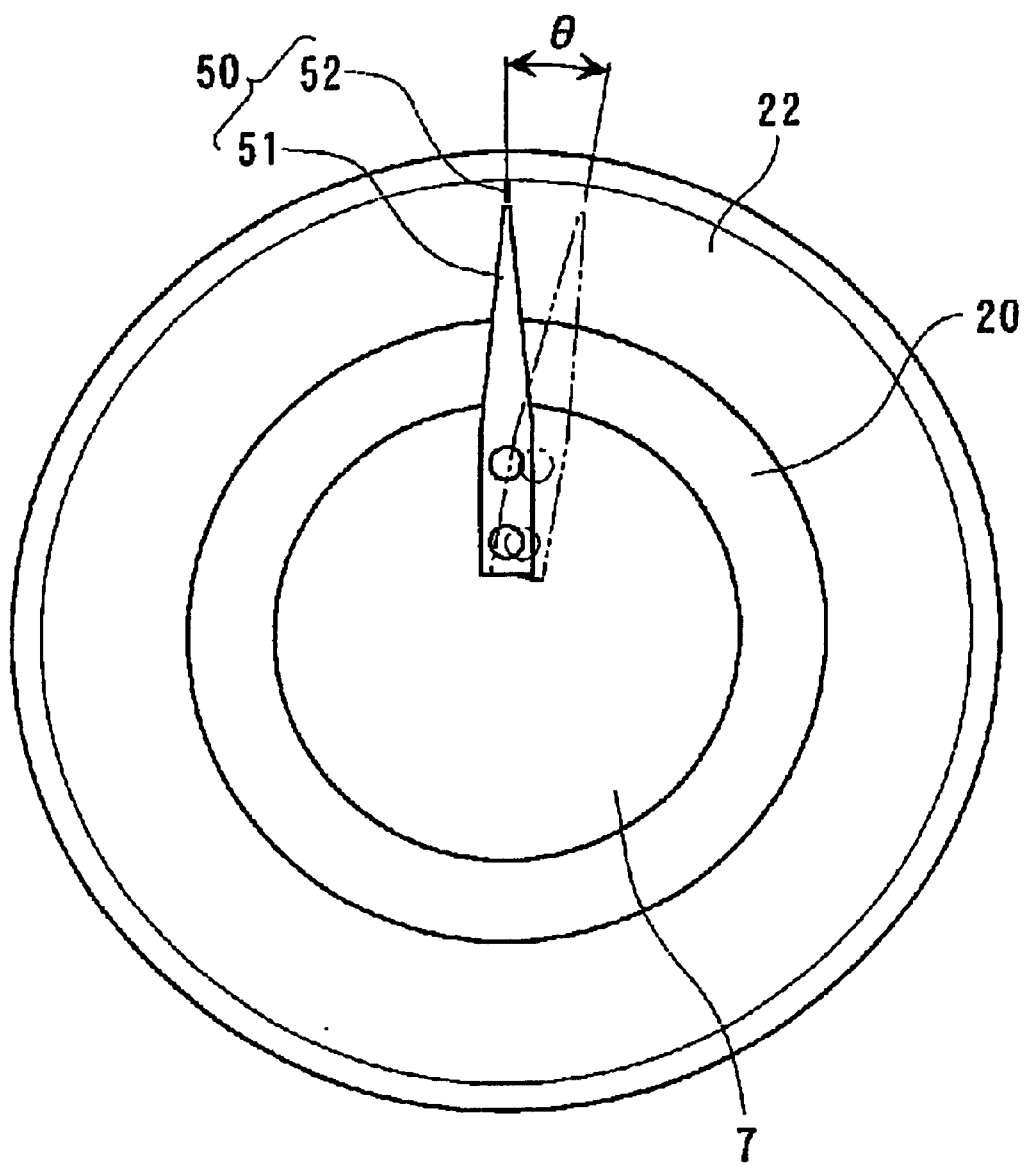
FIG. 5 is a view from an arrow V in FIG. 2.

Meanwhile, as shown in FIGS. 2 and 5, provided for the drive shaft 7 and boss 22 is position discrepancy detecting means 50 for detecting a position discrepancy of the drive shaft 7 relative to the brake center 18.

Namely, the position discrepancy detecting means 50 is constituted to include a pointing needle 51 mounted to one end surface of the drive shaft 7 and a matchmark 52 marked at one end surface of the boss 22 facing to the pointing needle 51, so as to detect an angle discrepancy when the drive shaft 7 is rotated relative to the boss 22 such as due to slippage of the span-ring 20. Thus, it becomes possible to find a discrepancy such as by checking the pointing needle 51 of the stopped drive shaft 7 such as at each replacement of a product lot.

The disk shaped clutch center 15 constituting the aforementioned clutch device 6 is fixed, such as by welding, to a boss 23 fitted onto the drive shaft 7. Provided between this boss 23 and the drive shaft 7 is a clutch-aimed span-ring 120 having the same structure as the span-ring 20.

Since the clutch device 6 side is not provided with the mechanical engaging means 30, the span-ring 120 is constituted to have an inner diameter larger than that of the brake side span-ring 20, and a longer whole length, so as to transmit a larger torque. However, it is possible to constitute both span-rings 20, 120 at the same size and the same length.

Reference numerals 91 and 92 in the figures designate bearings of the drive shaft 7, and reference numeral 93 designates an oil thrower.

There will be now described an operation of the above described embodiment.

Actuating the motor 4 so as to drive the press machine 1 rotates flywheel 6a of the clutch device 6 via belt 5. Engaging the clutch member 16 with the clutch center 15 in a clutch-on state causes the rotary power from the motor 4 to be transmitted to the drive shaft 7, since the clutch center 15 integrated with the boss 23 are coupled with the drive shaft 7 by span-ring 120.

At this time, the brake device 8 is not operated, since the brake center 18 and the brake member 19 of the brake device 8 are not engaged.

The rotation of the drive shaft 7 is transmitted, via span-ring 20, to the brake center 18 integrated with the boss 22.

At this time, the power from the drive shaft 7 is not transmitted to the brake center 18 via mechanical engaging means 30, because the drive shaft 7 and the spline bush 31, and the spline bush 31 and the boss 22 cooperatively constituting the mechanical engaging means 30 are engaged to each other, respectively, in a state where the outer involute spline 34 and the inside spline 32, and the outside spline 33 and the inner involute spline 35 maintain the gaps S therebetween in the rotational directions, respectively.

To stop the press machine, the clutch device 6 is to be brought into an off state, and the brake device 8 is to be brought into an on state, and then the rotary power between the drive shaft 7 and brake center 18 is stopped.

Occurrence of slippage in the span-ring 20 of the brake device 8 side such as due to the usage over years of the press machine 1 leads to a discrepancy between the drive shaft 7 and brake center 18. Nonetheless, this occurrence of discrepancy causes the teeth portions of the outer involute spline 34 of the drive shaft 7 and those of the inside spline 32 of the spline bush 31 to mesh with each other to thereby fill up the gaps S in the rotational direction, and causes the teeth portions of the outside spline 33 of the spline bush 31 and those of the inner involute spline 35 of the boss 22 to mesh with each other to thereby fill up the gaps S in the rotational direction, so that the outer involute spline 34 and the inside spline 32, and the outside spline 33 and the inner involute spline 35 are engaged with each other, respectively.

Namely, the power of the drive shaft 7 is resultantly transmitted to the brake center 18 via mechanical engaging means 30. Thus, even upon occurrence of slippage in the span-ring 20 as the friction means, there is safely held the torque transmission between the drive shaft 7 and brake center 18.

Note, the discrepancy between the drive shaft 7 and the boss 22 of brake center 18 is detected by the discrepancy between the pointing needle 51 and the matchmark 52 of the position discrepancy detecting means 50. Operator is to find a discrepancy such as by checking the pointing needle 51 of the stopped drive shaft 7 such as at each replacement of a product lot, and upon finding any discrepancy, is to adjust the span-ring 20 so as to conduct normal torque transmission. Under this normal state, the operation is to be resumed.

According to the embodiment as described above, there can be obtained the following effects.

(1) Occurrence of slippage in the span-ring 20 of the brake device 8 side such as due to the usage over years of the press machine 1 causes the teeth portions of the outer involute spline 34 of the drive shaft 7 and those of the inside spline 32 of the spline bush 31 to mesh with each other to thereby fill up the gaps S in the rotational direction, and causes the teeth portions of the outside spline 33 of the spline bush 31 and those of the inner involute spline 35 of the boss 22 to mesh with each other to thereby fill up the gaps S in the rotational direction, so that the drive shaft 7 and the brake center 18 are coupled in the rotational direction to thereby allow power transmission between the drive shaft 7 and brake center 18. Thus, even upon occurrence of slippage in the span-ring 20, the power transmission is allowed by the mechanical engaging means 30 so as to validate the brake device, thereby achieving the mechanical press having higher safety.

(2) No rotary power is transmitted by the mechanical engaging means 30 in a normal state, since the inside spline 32 of spline bush 31 and the outer involute spline 34 of drive shaft 7 and the outside spline 33 of spline bush 31 and the inner involute spline 35 of boss 22 are engaged with each other, respectively, with gaps S in the rotational directions. Thus, it becomes possible to prevent repeated loads of the rotary power transmission, such as for the spline bush 31. As a result, there can be prevented wear, damage and depletion, such as of the spline bush 31.

(3) The spline bush 31 is provided with the meshing portions entirely and uniformly distributed over the inner and outer peripheries in the circumferential direction, thereby enabling strengthened and assured torque transmission.

[Spline Bush Manufacturing Method in The First Embodiment]

There will be described a manufacturing method of the spline bush 31 constituting the mechanical engaging means 30 to be used in the above described first embodiment, with reference to FIGS. 6 through 14.

Figure 6:
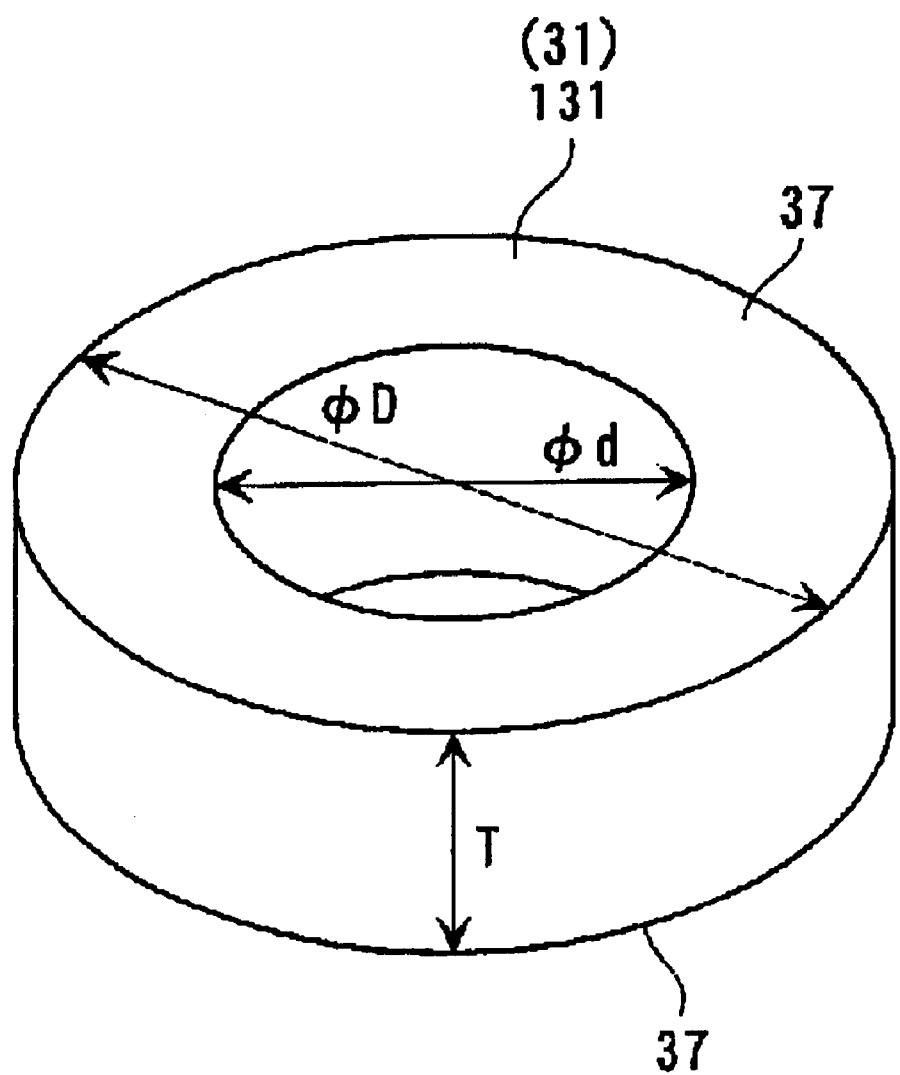
FIG. 6 is a perspective view of the whole of a blank of a spline bush to be used for the above embodiment, as a view showing a manufacturing procedure of the spline bush.
Figure 7:
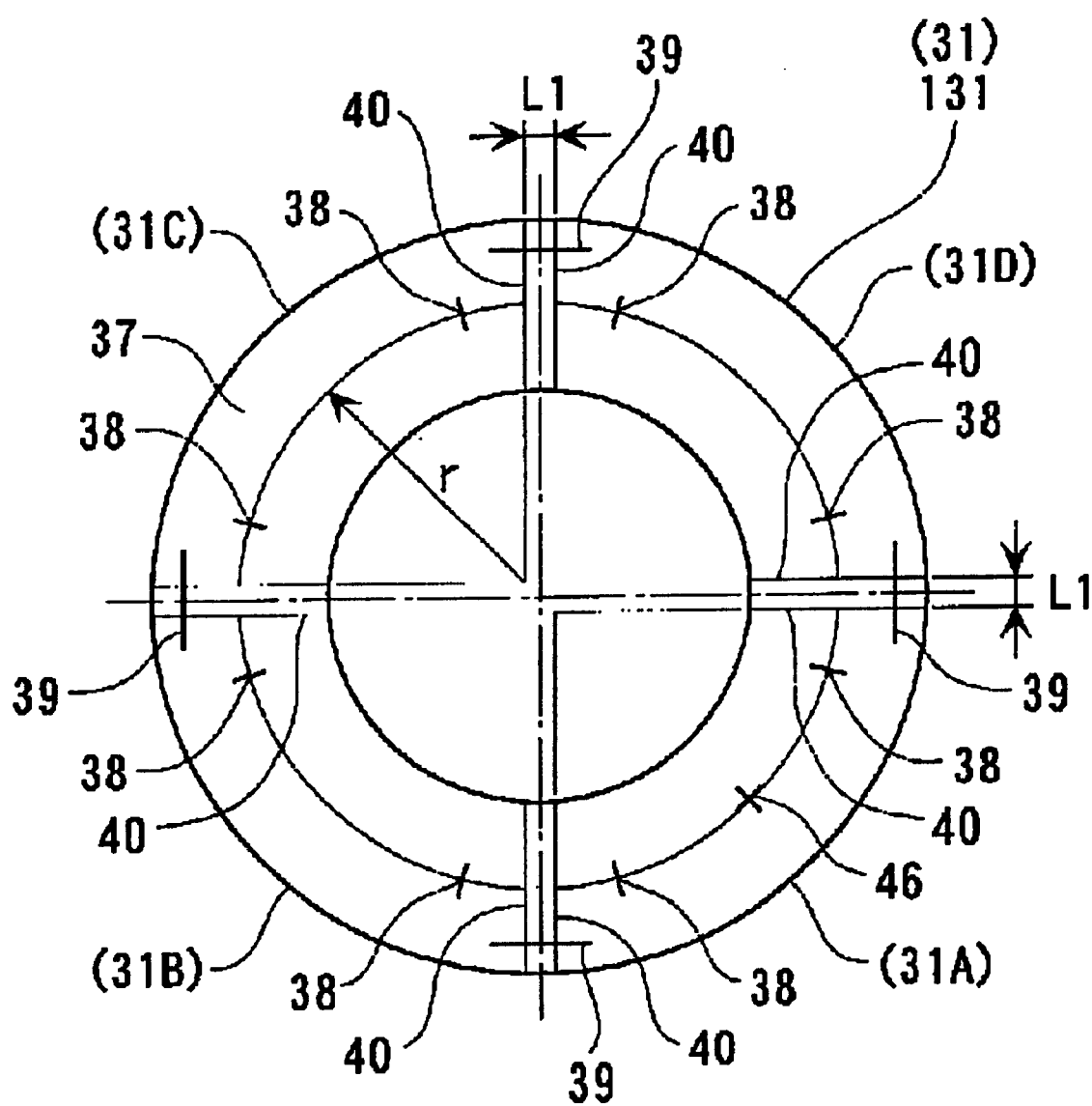
FIG. 7 is a view showing markings before division, as a view showing a further manufacturing procedure of the spline bush of the above embodiment.

Firstly, as shown in FIG. 6, there is prepared a toroidal member (blank) 131 having an outer diameter $\phi D$, an inner diameter $\phi d$ and a thickness T, as a blank for the spline bush 31. Then, this toroidal member 131 is thermally refined, followed by finishing of both end surfaces 37, 37 thereof. Next, as markings before quarter division, both end surfaces 37, 37 of the toroidal member 131 are marked with: tap positions 38 for mounting jigs thereto; a hole position 46 of a knock pin for preventing rotation of the oil thrower 93 relative to the spline bush 31; and matchmarks 39 to be used upon re-assembling after division.

At this time, the toroidal member 131 is marked for the quarter division, since the spline bush 31 is constituted of quarter members in this embodiment.

Each of the end surfaces 37, 37 of the toroidal member 131 is marked with eight cutting lines 40, each accompanied two of which are parallel with each other and interpose therebetween one of two lines mutually orthogonalized at the center of the end surface of the toroidal member 131, such that each accompanied two cutting lines 40 are spaced from each other by a dimension L1 which is a sum of: a presumed cutting margin for a cutter in case of cutting such as by a contour machine; and a presumed finishing margin such as by a surfacer. Next, each quadrant of each end surface of the toroidal member 131 is: marked with a partial circle having a radius r based on or around a center which is an intersection between extended and mutually orthogonalized neighboring two cutting lines 40; and marked with tap positions 38 determined at predetermined angles from cutting lines 40 around the intersection, respectively. These tap positions 38 are marked such that they are arranged at two positions in each of the spline members 31A to 31D after quarter division, so that these tap positions 38 are marked at 8 positions at one of the end surfaces 37, 37 of the spline bush 31, and at totally 16 positions (at both end surfaces).

The reason why the cutting lines 40 are treated as references is that those tap positions 38 are to be placed on a perfect circle upon assembling the spline members 31A to 31D. Each matchmark 39 is marked such that the same strides over the pertinent two parallel cutting lines 40 in a manner orthogonalized thereto.

Figure 8:
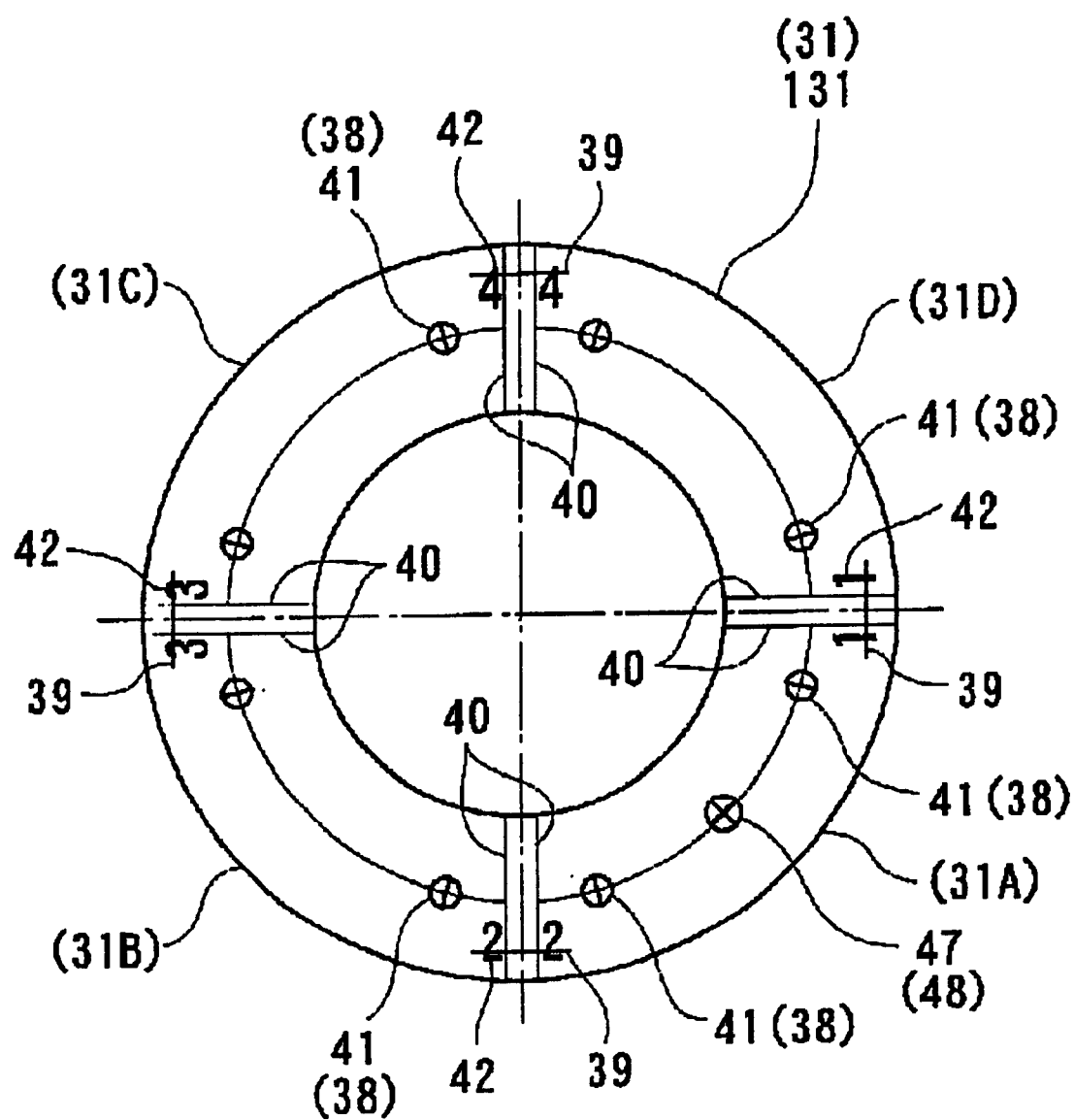
FIG. 8 is a view showing a state where the blank is tapped at the marking positions and then marked, as a view showing a further manufacturing procedure of the splint bush of the above embodiment.

Next, as shown in FIG. 8, each of the 16 pieces of tap positions 38 of the toroidal member 131 is bored with an auger hole as a rough hole; the rough hole is expanded to a tap hole 41; markings 42 such as numerals 1, 1 or 2, 2 are provided at positions of the matchmarks 39 such as of spline member 31A and spline member 31D to be formed by division; so as to enable positioning upon arranging the divided spline members 31A to 31D in a circular shape. The knock pin hole position 46 is bored as a knock pin hole 47. This knock pin hole 47 is fitted with one end of a knock pin 48 as shown in FIG. 2 such as upon assembling the spline bush 31, while the other end of the knock pin 48 is adapted to be inserted into a knock pin hole of the oil thrower 93 so as to prevent the rotation of the oil thrower 93.

Figure 9:
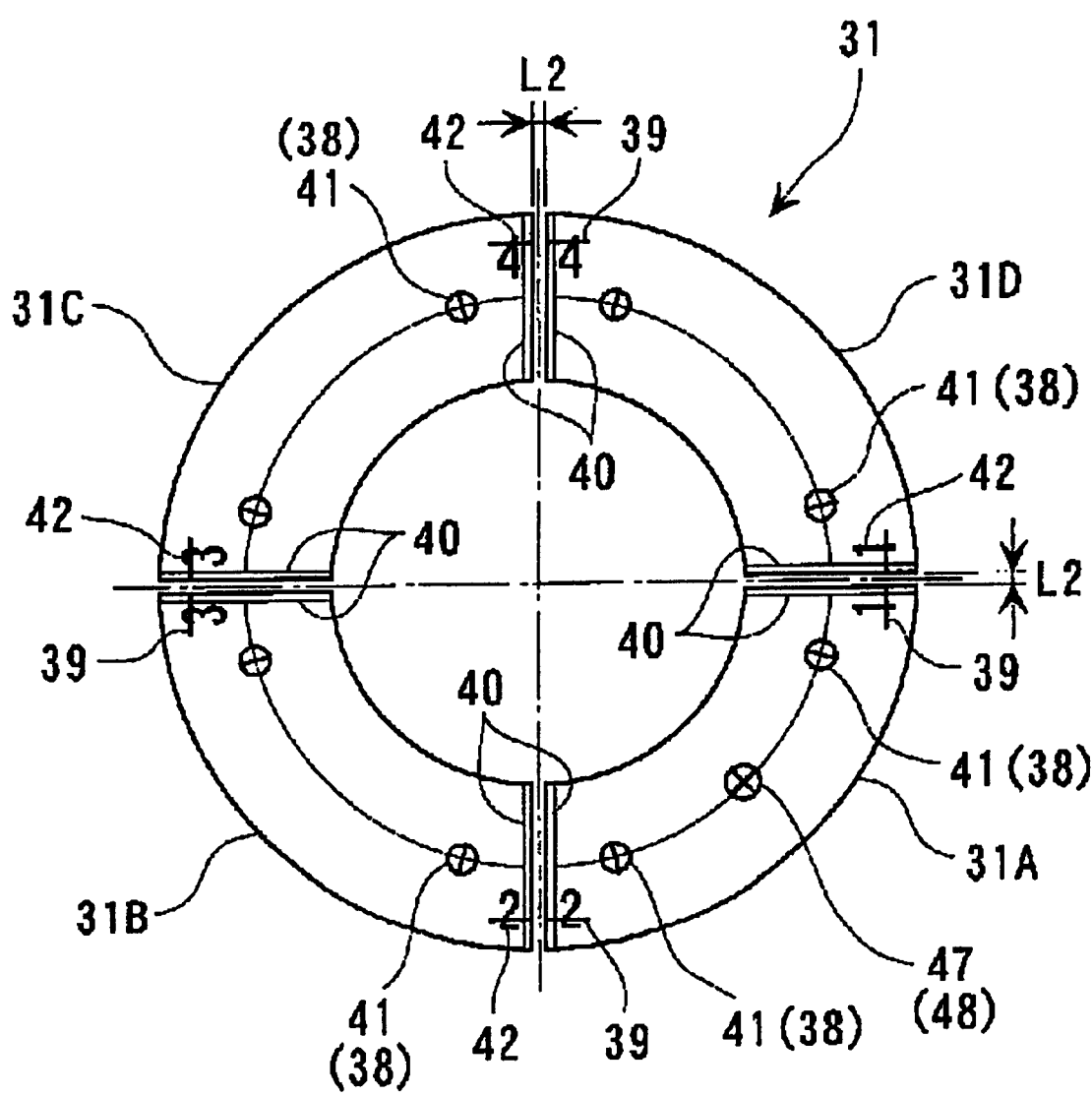
FIG. 9 is a view showing a state where the blank is divided, as a view showing a further manufacturing procedure of the spline bush of the above embodiment.

Upon completion of drilling, tap machining, the machining of the knock pin hole 47, and marking operation, the toroidal member 131 is divided into four members such as by a contour machine, as shown in FIG. 9. At this time, the cutting is conducted along the insides of paired cutting lines 40 such as by using a cutter having an edge width dimension L2 which is slightly narrower than the width dimension between the paired cutting lines 40.

Figure 10:
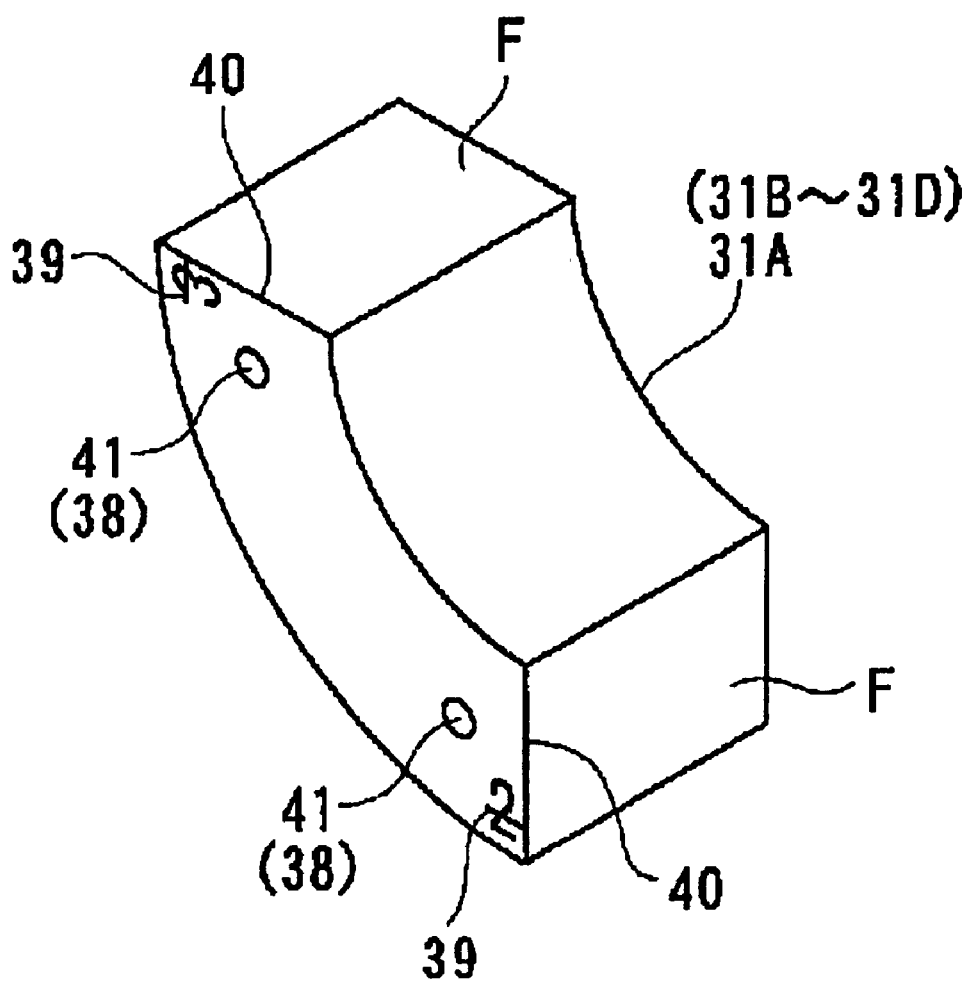
FIG. 10 is a view showing one of the divided parts, as a view showing a farther manufacturing procedure of the spline bush of the above embodiment.

Next, each of cut surfaces F of the quarter spline members 31A to 31D is precisely finished along cutting lines 40 such as by a surfacer, as shown in FIG. 10.

Figure 11:
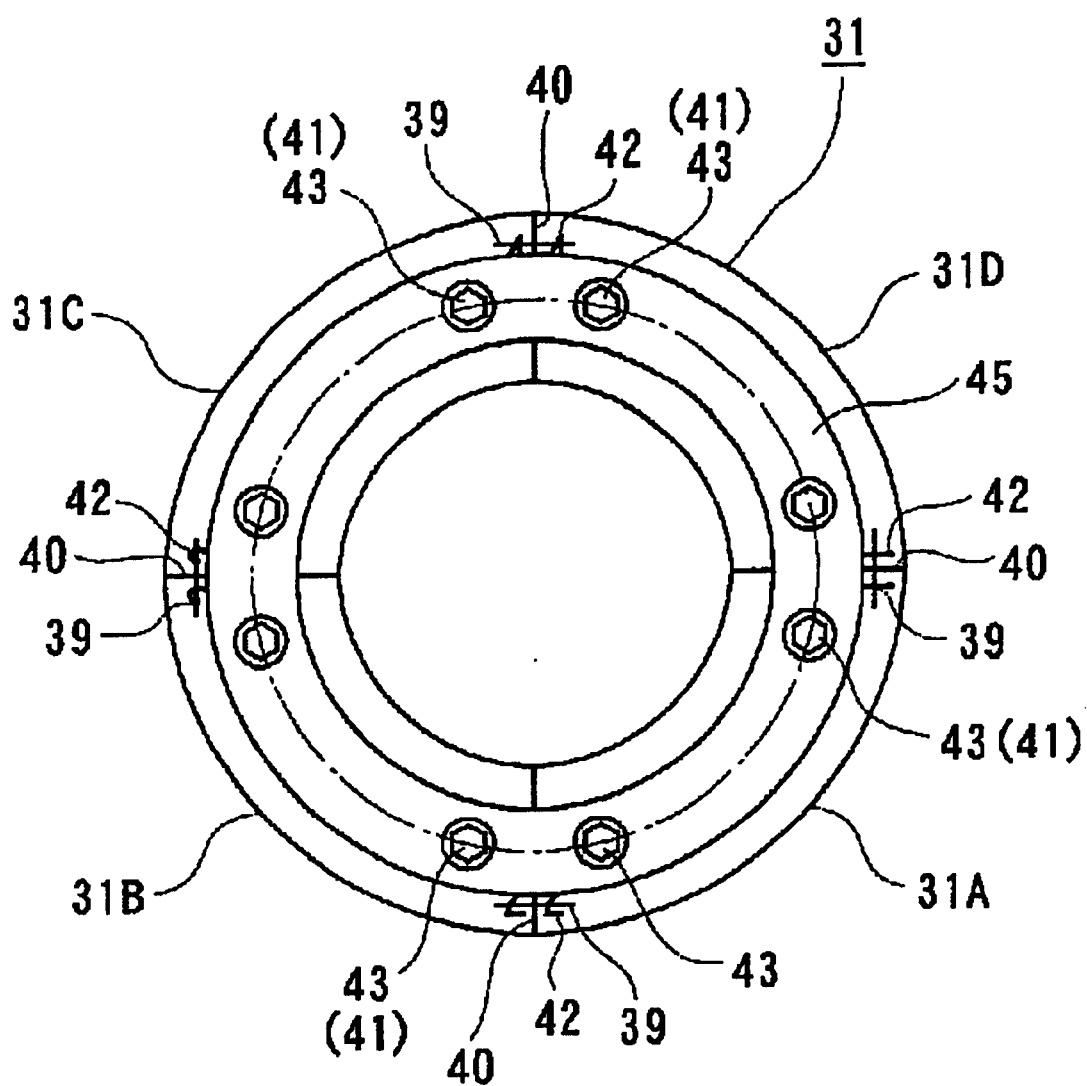
FIG. 11 is a view showing a state where the divided parts are assembled by jigs, as a view showing a further manufacturing procedure of the spline bush of the above embodiment.

Then, as shown in FIG. 11, the spline members 31A to 31D are arranged to match paired markings 42 with each other, and bolts 43 together with each ring-shaped jig 45 are threaded into tap holes 41 of the spline members 31A to 31D so as to match paired matchmarks 39 with each other, to thereby clamp each jig 45 and spline members 31A to 31D with each other.

Figure 12:
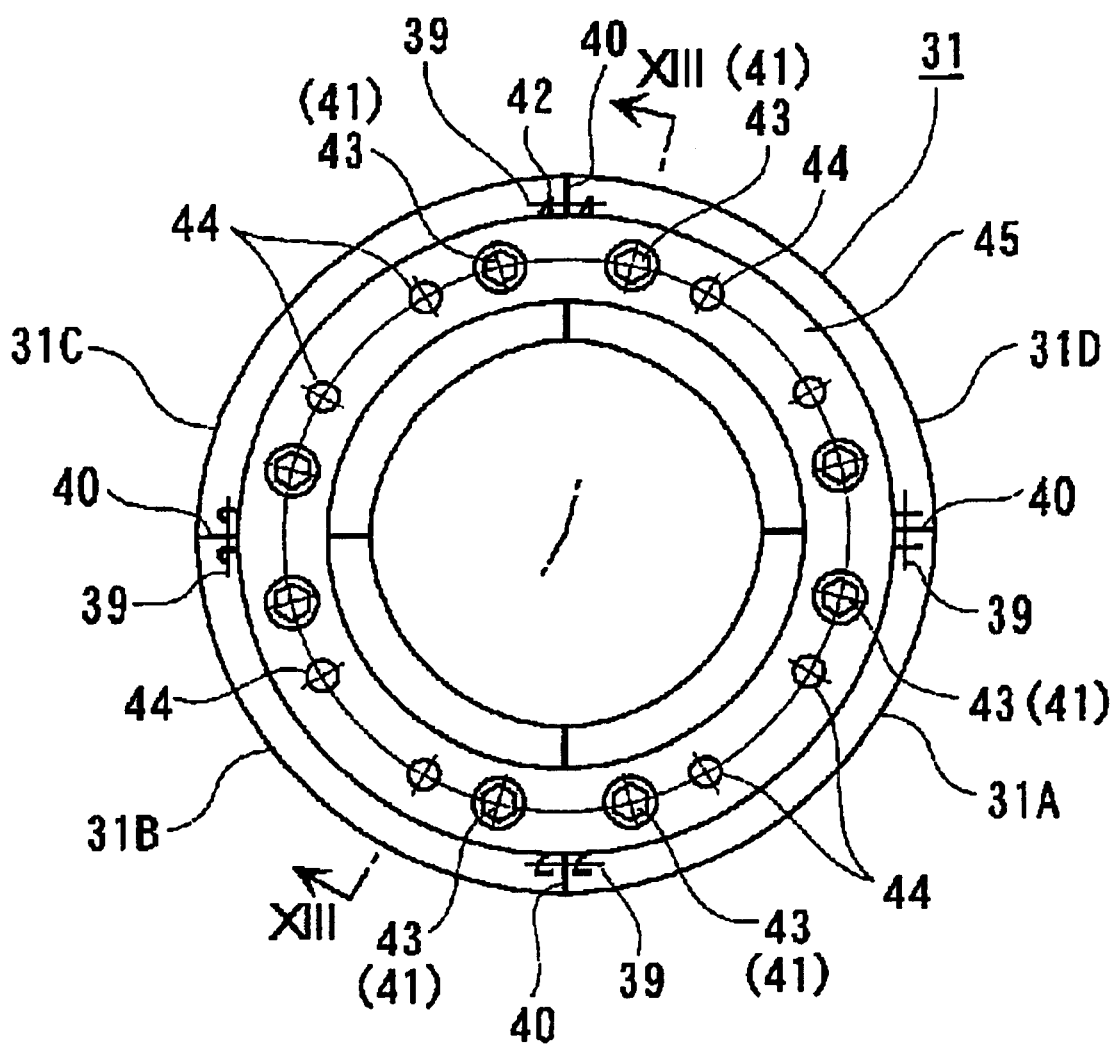
FIG. 12 is a view showing a state where knock pins have been knocked into the divided parts together with the jigs by cooperative working, as a view showing a further manufacturing procedure of the spline bush of the above embodiment.
Figure 13:
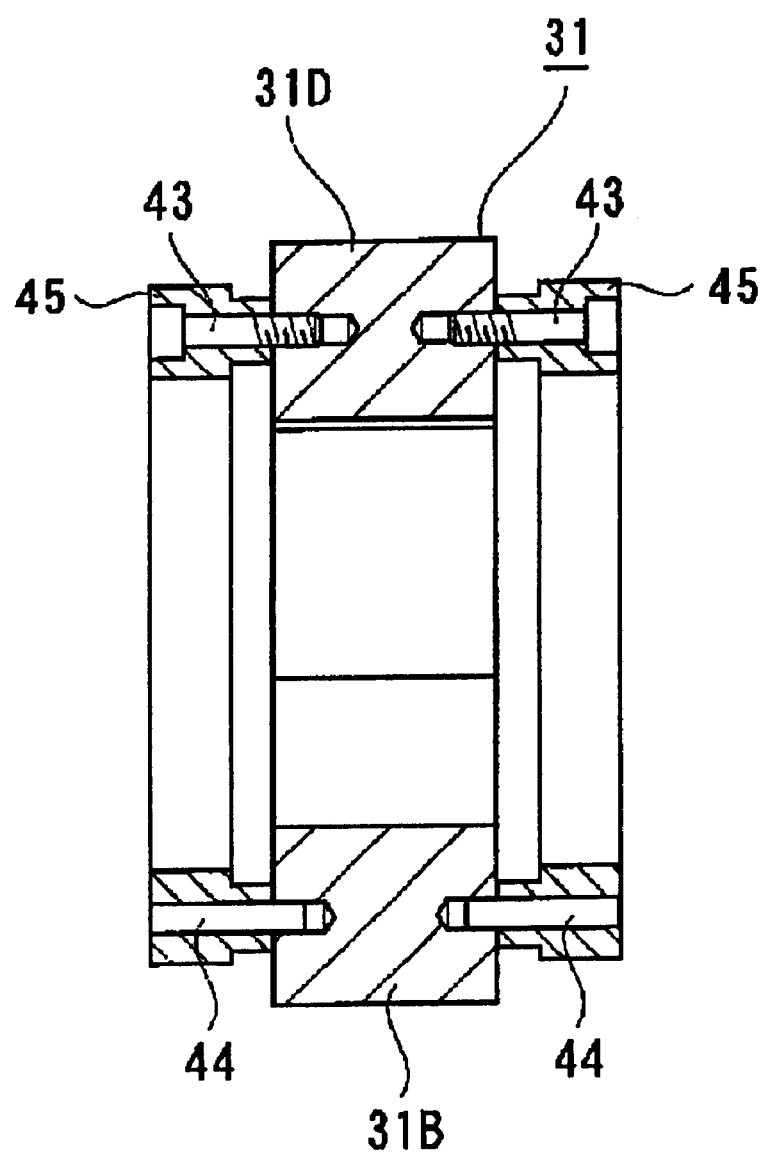
FIG. 13 is a cross-sectional view taken along a line XIII—XIII of FIG. 12.

Under this state as shown in FIGS. 12 and 13, each knock pin hole is machined from the spline members (31A to 31D) to the jig 45 at a time so that each of spline members 31A to 31D has knock pin holes, for instance, at two positions; each knock pin hole is knocked with a knock pin 44; and each bolt 43 is further threaded from each jig 45 side into the associated one of spline members 31A to 31D; to thereby firmly couple jigs 45 and spline members 31A to 31D to one another.

Figure 14:
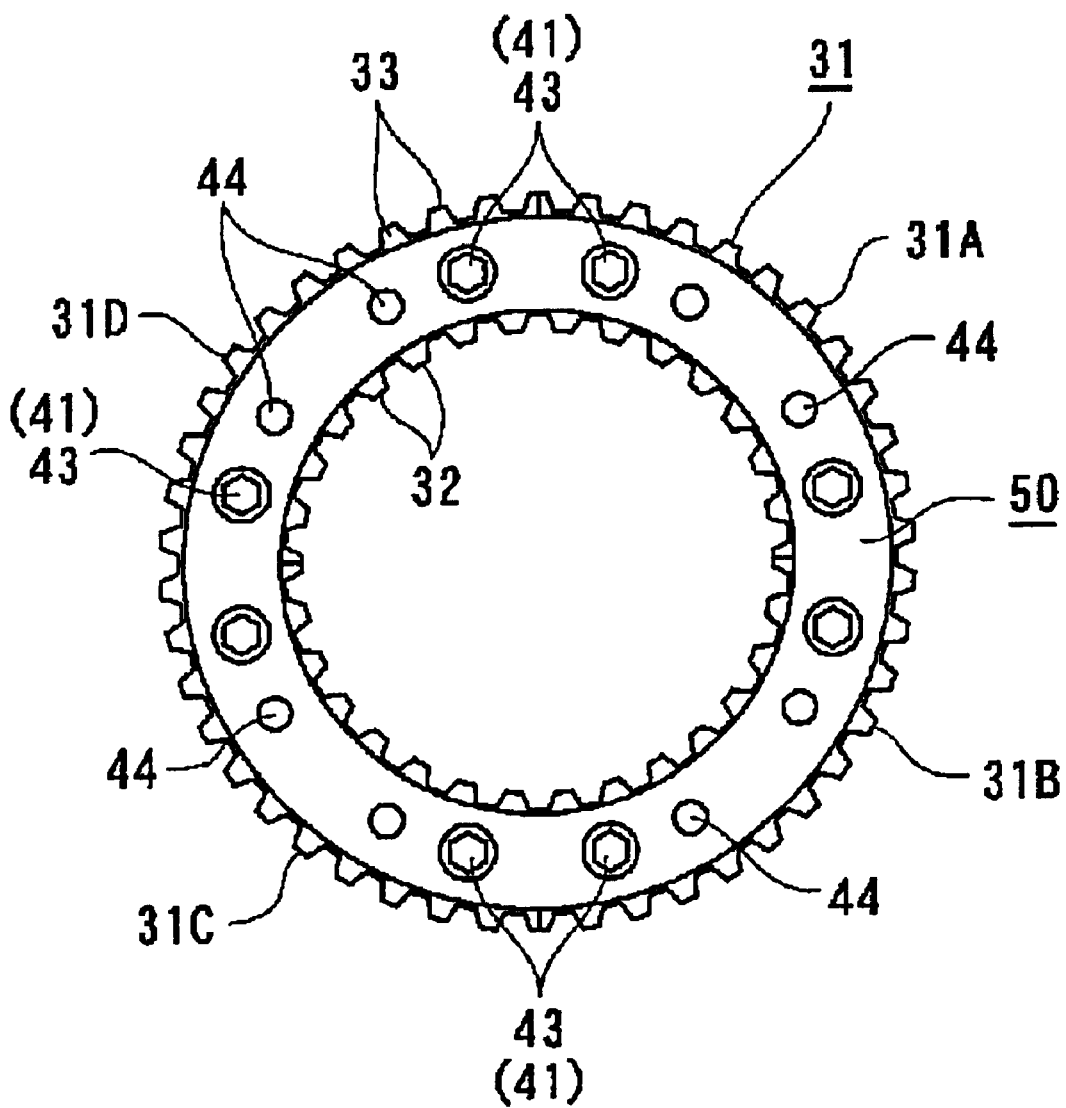
FIG. 14 is a view showing a state where the spline bush has been splined, as a view showing a further manufacturing procedure of the spline bush of the above embodiment.

Then, as shown in FIG. 14, the inner periphery and outer periphery of each of the spline members 31A to 31D are machined, i.e., there is conducted machining of the inside involute spline 32 and the outside involute spline 33 of the spline bush 31, to thereby form the quarter division type spline bush 31 having splines at its inner and outer peripheries, at its inner diameter portion and outer diameter portion.

Of course, each jig 45 is removed from the spline bush 31, upon mounting the spline bush 31 onto the drive shaft 7.

The above described manufacturing method of the spline bush 31 has the following effects:

(4) The spline bush 31 is constituted of quarter spline members 31A to 31D, so that the spline bush 31 can be readily mounted onto the drive shaft 7, and can be later mounted.

(5) The spline members 31A to 31D constituting the spline bush 31 are splined at their inner and outer peripheries, in a state where the spline members 31A to 31D are fixed to one another by many bolts 43 and knock pins 44 via ring-shaped jigs 45 to thereby clamp both end surfaces of the spline members 31A to 31D between the jigs 45, after the spline members 31A to 31D are divided and duly machined. This enables precise splining, to thereby precisely manufacture the spline bush 31.

(6) Unlike a spline which is provided at an end portion of a shaft and which has a diameter smaller than that of the shaft, it is possible to engage the spline bush 31, from the outward, to a spline provided at an intermediate position between both ends of the shaft (drive shaft) 7, to thereby increase the design freedom.

[Second Embodiment]

Figure 15B:
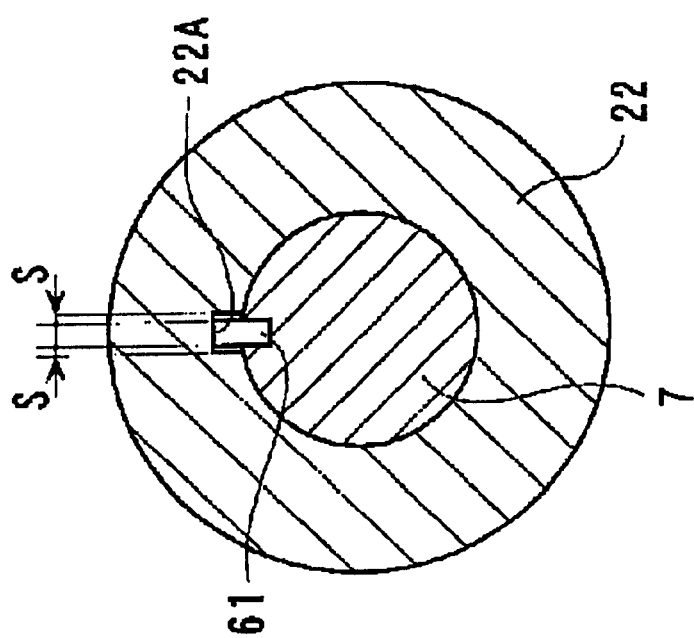
FIG. 15(A) and FIG. 15(B) are views showing a second embodiment of the present invention, FIG. 15(A) being a cross-sectional view showing a shaft coupling structure, FIG. 15(B) being a cross-sectional view taken along B—B line in FIG. 15(A)
Figure 15A:
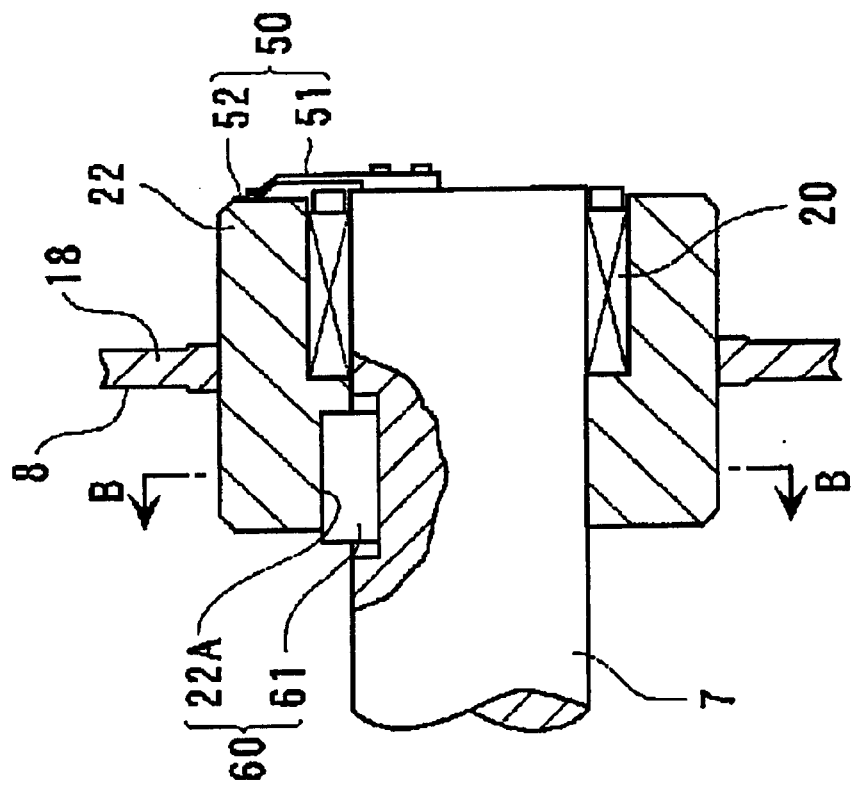

There will be now described a second embodiment of the present invention, with reference to FIGS. 15(A) and 15(B).

Like reference numerals as used in the first embodiment are used to denote corresponding or identical elements in this embodiment and third and fourth embodiments to be described later herein, to omit or simplify their detailed description.

This embodiment adopts a key connection as the mechanical engaging means.

Namely, there is provided mechanical engaging means 60 adjacent to the span-ring 20 as the main power means provided on the drive shaft 7. This mechanical engaging means 60 is constituted of: a key 61 set in a key way of the drive shaft 7; and a key way 22A formed in the boss 22 and engageable with the key 61.

At this time, there are formed predetermined gaps S between the key 61 and key way 22A in their width direction, i.e., in the respective rotational directions. As such, even when the drive shaft 7 and brake center 18 are displaced from each other due to occurrence of slippage in the span-ring 20, either of the gaps S in the key way 22A is filled up by the key 61 as the drive shaft 7 rotates, so that the rotary power of the drive shaft 7 is transmitted to the brake center 18 via mechanical engaging means 60.

The embodiment as described just above has the following effects:

(7) Even upon occurrence of slippage in the span-ring 20, the power transmission is allowed by the mechanical engaging means 60 having the key connection structure so as to validate the brake device, thereby providing a mechanical press of higher safety.

(8) The mechanical engaging means 60 is constituted of the key 61 and key way 22A, so that the means 60 has a simple constitution which can be readily produced and mounted and can be used for transmission of a relatively small torque.

[Third Embodiment]

Figure 16B:
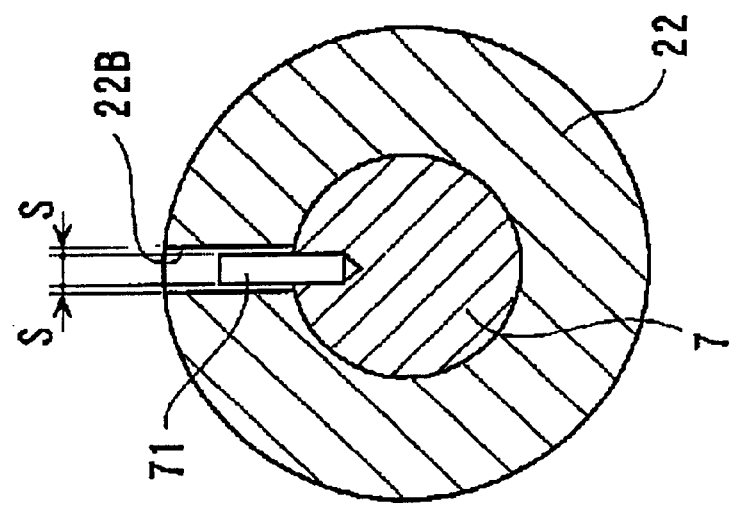
FIG. 16(A) and FIG. 16(B) are views showing a third embodiment of the present invention, FIG. 16(A) being a cross-sectional view showing a shaft coupling structure, FIG. 16(B) being a cross-sectional view taken along B—B line in FIG. 16(A)
Figure 16A:
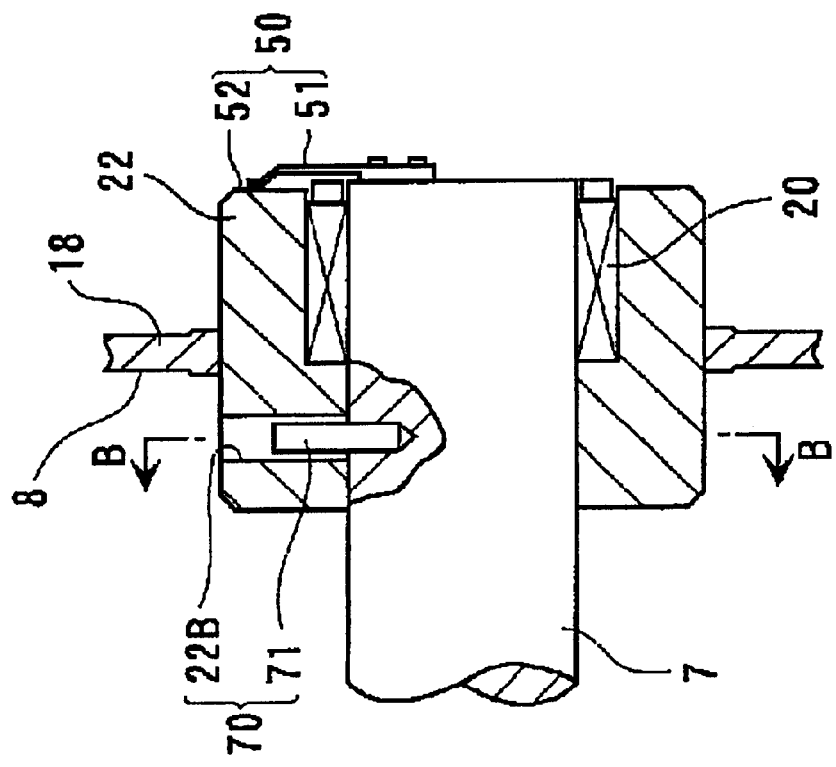

There will be now described a third embodiment of the present invention, with reference to FIGS. 16(A) and 16(3).

This embodiment adopts a pin connection as the mechanical engaging means.

Namely, there is provided mechanical engaging means 70 adjacent to the span-ring 20 provided on the drive shaft 7. This mechanical engaging means 70 is constituted of: a pin 71 buried in the drive shaft 7; and an engage hole 22B bored in the boss 22 and engageable with the pin 71.

At this time, the pin 71 and engage hole 223 are formed in dimensions to provide backlashes therebetween so that predetermined gaps S are formed in the respective rotational directions.

As such, even when the drive shaft 7 and brake center 18 are displaced from each other due to occurrence of slippage in the span-ring 20, either of the gaps S in the engage hole 22B is filled up by the pin 71 as the drive shaft 7 rotates, so that the rotary power of the drive shaft 7 is transmitted to the brake center 18 via mechanical engaging means 70.

The embodiment as described just above has the following effects:

(9) Even upon occurrence of slippage in the span-ring 20, the power transmission is allowed by the mechanical engaging means 70 having the pin connection structure so as to validate the brake device, thereby providing a mechanical press of higher safety.

(10) The mechanical engaging means. 70 can be provided by simply burying the pin 71 into the drive shaft 7 and by forming the engage hole 22B in the boss 22 such as by a drill, so that the means 70 has a simpler constitution than the second embodiment and can be readily produced and can be used for transmission of a relatively small torque.

[Fourth Embodiment]

There will be now described a fourth embodiment of the present invention, with reference to FIGS. 17(A) and 17(B).

This embodiment adopts an involute spline connection as the mechanical engaging means. Although the above described first embodiment has adopted the involute spline connection including the spline bush 31 provided between the drive shaft 7 and boss 22, this embodiment includes the involute spline directly formed on the drive shaft 7 and boss 22 without the spline bush 31.

Namely, there is provided mechanical engaging means 80 adjacent to the span-ring 20 provided on the drive shaft 7. This mechanical engaging means 80 is constituted to include: an outer involute spline 80A of a predetermined length directly formed on the drive shaft 7; and an inner involute spline 80B directly formed on the boss 22 and engageable with the outer involute spline 80A.

At this time, there are formed predetermined gaps S in the respective rotational directions of both involute splines 80A, 80B. As such, even when the drive shaft 7 and brake center 18 are displaced from each other due to occurrence of slippage in the span-ring 20, either of the gaps S of the involute splines 80A, 80B is filled up by the teeth as the drive shaft 7 rotates, so that the rotary power of the dive shaft 7 is transmitted to the brake center 18 via mechanical engaging means 80.

The embodiment as described just above has the following effect, in addition to those effects attained by the first through third embodiments:

(11) The mechanical engaging means 80 is provided by directly forming the outer involute splint 80A and inner involute spline 80B on the drive shaft 7 and boss 22, respectively, thereby allowing to omit the spline bush 31 used in the first embodiment, resulting in reduced steps of production and a smaller number of parts.

[Modification]

The present invention is not limited to those embodiments as described above, and may include other modified versions insofar as achieving the above described object of the present invention.

For example, in the above described embodiments, the friction coupling as main power transmitting means has been constituted of the span-ring 20. However, the present invention is not limited thereto. It is possible to adopt any type of friction coupling, such as shrink fit or cooling fit between the drive shaft 7 and brake center 18 (boss 22).

Further, the spline bush 31 has been constituted of the quarter spline members 31A to 31D in the first embodiment. However, the present invention is not limited thereto. For example, the spline members may be constituted of those members provided by dividing the toroidal member into three, two or more than four pieces. Note, division into an excess number of pieces rather complicates fabricating and assembling steps of the spline bush, and is not so preferable.

Moreover, in the manufacturing method of the spline members 31A to 31D constituting the spline bush 31 in the first embodiment, each of the splint members 31A to 31D has been assigned with two tap positions and two knock pins. However, the present invention is not limited thereto. For example, the number of tap positions and the number of knock pin positions may be appropriately set as required, such as 3 tap positions and 2 knock pin positions, or 2 tap positions and 1 knock pin position.

Furthermore, the mechanical engaging means 60 in the second embodiment has been established by providing one combination of the key 61 and the key way 22A engageable with the key 61, while the mechanical engaging means 70 in the third embodiment has been established by providing one combination of the pin 71 and the engage hole 22B engageable with the pin 71. However, the present invention is not limited thereto. For example, two or more of such combinations may be provided.

In such a case, there can be transmitted a torque larger than that in the second embodiment and third embodiment.

What is claimed is:

1. A shaft coupling structure for transmitting a rotary power between a shaft-side member and a boss-side member, said shaft coupling structure comprising:

friction-engaged main power transmitting means provided between the shaft-side member and the boss-side member, the main power transmitting means transmitting power under a normal operating condition in which the main power transmitting means frictionally engages the shaft-side member with the boss-side member; and an auxiliary power transmitting means provided adjacent to said main power transmitting means for mechanically engaging the shaft-side member with the boss-side member, the auxiliary power transmitting means transmitting power when the main power transmitting means is slipped from frictional engagement with the shaft-side member and the boss-side member.

2. The shaft coupling structure according to claim 1, wherein said auxiliary power transmitting means has a predetermined gap in a rotational direction thereof.

3. The shaft coupling structure according to claim 2, wherein said auxiliary power transmitting means comprises a radially divided spline.

4. A shaft coupling structure for transmitting a rotary power between a shaft-side member and a boss-side member, said shaft coupling structure comprising:

a friction-engaged main power transmitting means provided between the shaft-side member and the boss-side member; and an auxiliary power transmitting means provided adjacent to said main power transmitting means for mechanically engaging the shaft-side member with the boss-side member when the main power transmitting means is slipped from frictional engagement with the shaft-side member and the boss-side member, wherein the shaft coupling structure is applied to a brake device of a press machine, and wherein a drive shaft of the brake device is the shaft-side member and a brake center of the brake device is the boss-side member.

5. A shaft coupling structure for transmitting a rotary power between a shaft-side member and a boss-side member, said shaft coupling structure comprising:

a friction-engaged main power transmitting means provided between the shaft-side member and the boss-side member; and an auxiliary power transmitting means provided adjacent to said main power transmitting means for mechanically engaging the shaft-side member with the boss-side member when the main power transmitting means is slipped from frictional engagement with the shaft-side member and the boss-side member;

wherein said auxiliary power transmitting means has a predetermined gap in a rotational direction thereof, wherein the shaft coupling structure is applied to a brake device of a press machine, and wherein a drive shaft of the brake device is the shaft-side member and a break center of the brake device is the boss-side member.

* * * * *